Patented June 6, 1939

2,161,772

UNITED STATES PATENT OFFICE 2,161,772

PHENOL STABILIZATION

Thomas S. Carswell, Kirkwood, Mo., assignor to Monsanto Chemical Company, St. Louis, Mo., a corporation of Delaware No Drawing. Application April 17, 1936,
Serial No. 74,961

7 Claims. (Cl. 23—250)

The present invention relates to the treatment of phenolic compounds and it has particular relation to treatment of such compounds for the purpose of inhibiting color changes therein upon ageing.

The main objects of the invention are to provide an inhibitor of color change for phenolic compounds which is effective in such small amounts as not substantially to modify the desired characteristics of the compounds; which produces color stability over a relatively long period of time and which can be obtained at relatively slight expense.

These and other objects will be apparent from the following specification and the appended claims.

It has heretofore been observed that many phenolic bodies such as: benzyl phenols, phenol, resorcinol, hydroquinone, cresols, and the like tended upon ageing to undergo marked color changes which were suggestive of deterioration of quality and which, accordingly, tended to reduce public acceptance of the product. Inhibition of this type of change in the product by addition of conventional stabilizers such as are used to prevent deterioration of rubber, soap, gasolene and other organic materials offered great difficulty because of the characteristics of the compound to be stabilized. Not only was it necessary to obtain a material which was soluble in the phenolic compounds to be stabilized; but the stabilizer was required to be effective in such small amounts are not appreciably to affect the composition of the phenolic bodies. Furthermore it was requisite that the stabilizer itself should not be subject to decomposition to form colored products. As is well-known, most stabilizers of organic materials are either initially of high color or else in the exercise of their preservative action they undergo gradual change into compounds of high color. In such materials as rubber, color is a relatively unimportant feature and usually the color inherent therein is so intense as to mask ordinary changes due to decomposition of the stabilizer employed. However, in phenolic bodies color change is the phenomenon which is to be inhibited and in such materials conventional stabilizers would be worse than useless.

The present invention is based upon the discovery that thioureas, when added to phenols have the power of greatly retarding or even preventing during ordinary periods of time, objectionable color change. The compounds which are contemplated by the present invention, include as their main radical the characteristic group:

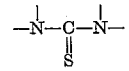

(where the nitrogen atoms may be connected to hydrogen or various organic groups to form symmetrical or unsymmetrical thiourea).

A few of the compounds contemplated include thiourea and symmetrically substituted thioureas, such as may be obtained by reacting such amines as orthoaminodiphenyl, cyclohexylamine, p-chloraniline and aniline with carbonbisulfide. This type of reaction is conventional and need not be described in detail.

Unsymmetrical thioureas may also be employed and in some cases they are especially effective. These compounds may be prepared by reacting a mustard oil of the formula: R—N=C=S. Where R is an organic group such as: phenyl, methyl substituted phenyl, propyl and the like group with a suitable amine. An excellent material for stabilization of phenols may be obtained in this manner by reacting ordinary phenyl mustard oil with a hydroxy amine such as: ethanol amine. This type of reaction is also conventional and is described in the literature and accordingly a detailed discussion is not believed to be necessary.

The following constitute specific examples illustrating the application of the principles of the invention:

*Example 1.*—Ordinary benzyl phenols (ortho, meta or para or mixtures thereof) which when freshly distilled are substantially water white may be stabilized by the addition of a small amount of N phenyl-N'-ethanol thiourea obtained by reacting phenyl mustard oil with ethanol amine. The compound is of the probable formula:

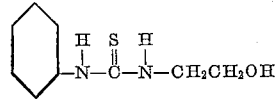

The stabilizer may be added in substantially any desired amount, although for most purposes an amount less than 1% based upon phenol content is sufficient. Good results are obtained by the addition of from .05 to .1%. The latter amount will stabilize the phenolic compound for an almost indefinite period of time. A control containing identically the same material except for the omission of the stabilizer undergoes substantial color modification within a period of 5 to 7 days. It will be appreciated that other monohydroxy amino alcohols such as: propanol and butanol amines may be substituted for ethanol amine and reacted with mustard oils including phenyl mustard oil to provide stabilizers.

*Example 2.*—Substitute a small amount (e. g., .1% of diphenylthiourea

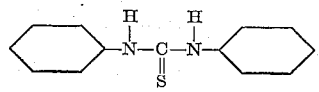

for the unsymmetrical thiourea described in Example 1. Excellent stabilization may thus be obtained. In like manner thioureas obtained by reacting orthoaminodiphenyl, cyclohexylamine or parachloraniline, or the like, with carbonbisulfide may be employed. The results thus obtained are not in all cases equal to those obtained from the use of diphenylthiourea. However, they do produce a substantial degree of stability and their use is contemplated as being within the purview of the present invention.

*Example 3.*—The unsymmetrical thioureas of the type disclosed in Example 1 and including the reaction product of ethanol amine with phenyl mustard oil are further reacted by heating with cresol or phenol in a suitable amount (e. g. dimolar ratio) to obtain compounds which markedly stabilize the color of various phenols such as benzyl phenols. The previously described symmetrical thioureas of Example 2 may also be reacted with these phenols to provide phenol stabilizers.

*Example 4.*—React an unsymmetrical thiourea such as N phenol, N' ethanol thiourea with a carboxylic acid such as: phthalic acid, succinic acid or maleic acid or fumaric acid. In a ratio of from ½ to 1 mol. per mol. of the thiourea and add the resultant reaction product to the phenol which is to be stabilized.

Although the stabilization of benzyl phenols, phenols and cresols has been specifically mentioned in the foregoing examples, it is to be understood that these are only representative; practically any of the phenols which are subject to discoloration on ageing or exposure to light or heat may be stabilized in similar manner.

The thiourea compounds in most instances are colorless and practically non-odorous and do not exercise any objectionable characteristics when added to the phenolic bodies. They are relatively inexpensive to prepare and since they exert a very strong stabilizing action, their application is highly desirable from a commercial viewpoint.

Although only the preferred forms of the invention have been described, it will be apparent to those skilled in the art that numerous modifications may be made therein without departure from the spirit of the invention or the scope of the appended claims:

What I claim is:
1. A method of stabilizing a phenol which comprises adding thereto a compound selected from the class composed of thiourea and substituted thioureas.
2. A highly stable phenol containing a small amount of a compound selected from the class composed of thiourea and substituted thioureas.
3. A method of treating phenols which comprise adding thereto a substituted thiourea containing a hydroxy group in an amount sufficient to enhance color stability.
4. A method of treating phenols which comprises adding thereto N phenyl, N' ethanol, thiourea in an amount sufficient to impart substantially enhanced color stability thereto.
5. A method of stabilizing phenols which comprises adding thereto an unsymmetrically substituted thiourea containing an alkylol group.
6. A phenol containing an alkylol substituted thiourea in an amount sufficient substantially to reduce color changes in the phenol.
7. A method of treating phenols which comprises adding thereto diphenylthiourea in an amount sufficient to impart substantially enhanced color stability thereto.

THOMAS S. CARSWELL.

CERTIFICATE OF CORRECTION.

Patent No. 2,161,772.  June 6, 1939.

THOMAS S. CARSWELL.

It is hereby certified that error appears in the printed specification of the above numbered patent requiring correction as follows: Page 2, first column, line 35, for "phenol" read phenyl; and that the said Letters Patent should be read with this correction therein that the same may conform to the record of the case in the Patent Office.

Signed and sealed this 11th day of July, A. D. 1939.

Henry Van Arsdale

Acting Commissioner of Patents.

(Seal)